US012226797B2

(12) United States Patent
Yoshida et al.

(10) Patent No.: US 12,226,797 B2
(45) Date of Patent: Feb. 18, 2025

(54) ELECTROSTATIC COATING SYSTEM AND METHOD

(71) Applicant: Carlisle Fluid Technologies, Inc., Scottsdale, AZ (US)

(72) Inventors: Osamu Yoshida, Scottsdale, AZ (US); Yoshiji Yokomizo, Scottsdale, AZ (US)

(*) Notice: Subject to any disclaimer, the term of this patent is extended or adjusted under 35 U.S.C. 154(b) by 601 days.

(21) Appl. No.: 17/442,981

(22) PCT Filed: Mar. 25, 2020

(86) PCT No.: PCT/US2020/024653
§ 371 (c)(1),
(2) Date: Sep. 24, 2021

(87) PCT Pub. No.: WO2020/198322
PCT Pub. Date: Oct. 1, 2020

(65) Prior Publication Data

US 2022/0184646 A1 Jun. 16, 2022

Related U.S. Application Data

(60) Provisional application No. 62/824,151, filed on Mar. 26, 2019.

(30) Foreign Application Priority Data

Mar. 25, 2019 (JP) ................................ 2019-057371

(51) Int. Cl.
*B05D 1/04* (2006.01)
*B05B 5/00* (2006.01)
*B05B 5/04* (2006.01)
*B05B 5/043* (2006.01)
*B05B 12/00* (2018.01)
*B05B 12/12* (2006.01)
(Continued)

(52) U.S. Cl.
CPC ................ *B05D 1/04* (2013.01); *B05B 5/006* (2013.01); *B05B 5/0407* (2013.01); *B05B 5/0426* (2013.01); *B05B 5/043* (2013.01); *B05B 12/006* (2013.01); *B05B 12/124* (2013.01); *B05B 13/0431* (2013.01); *B05B 15/68* (2018.02)

(58) Field of Classification Search
None
See application file for complete search history.

(56) References Cited

U.S. PATENT DOCUMENTS

2006/0175439 A1* 8/2006 Steur ....................... B05B 12/08 239/690
2016/0303588 A1* 10/2016 Arichi ...................... B05D 1/04
2017/0151577 A1* 6/2017 Baltz ....................... B05B 5/035

* cited by examiner

*Primary Examiner* — Michael P. Rodriguez
(74) *Attorney, Agent, or Firm* — Omnus Law; Peter J. Beardsley

(57) ABSTRACT

A coating apparatus can include a spray applicator configured to discharge a coating material toward a surface of a workpiece, wherein the spray applicator includes an air shaping orifice, and wherein the spray applicator is configured to generate an electric field between the spray applicator and the workpiece, and a positioning system configured to adjust a position of the spray applicator relative to the surface of the workpiece. It can further include a control system configured to regulate operation of the spray applicator and/or the positioning system to: maintain the spray applicator within a coating distance, maintain a flow rate of shaping air through the air shaping orifice, and maintain an electrical potential of the electric field.

5 Claims, 2 Drawing Sheets

Figure 1:
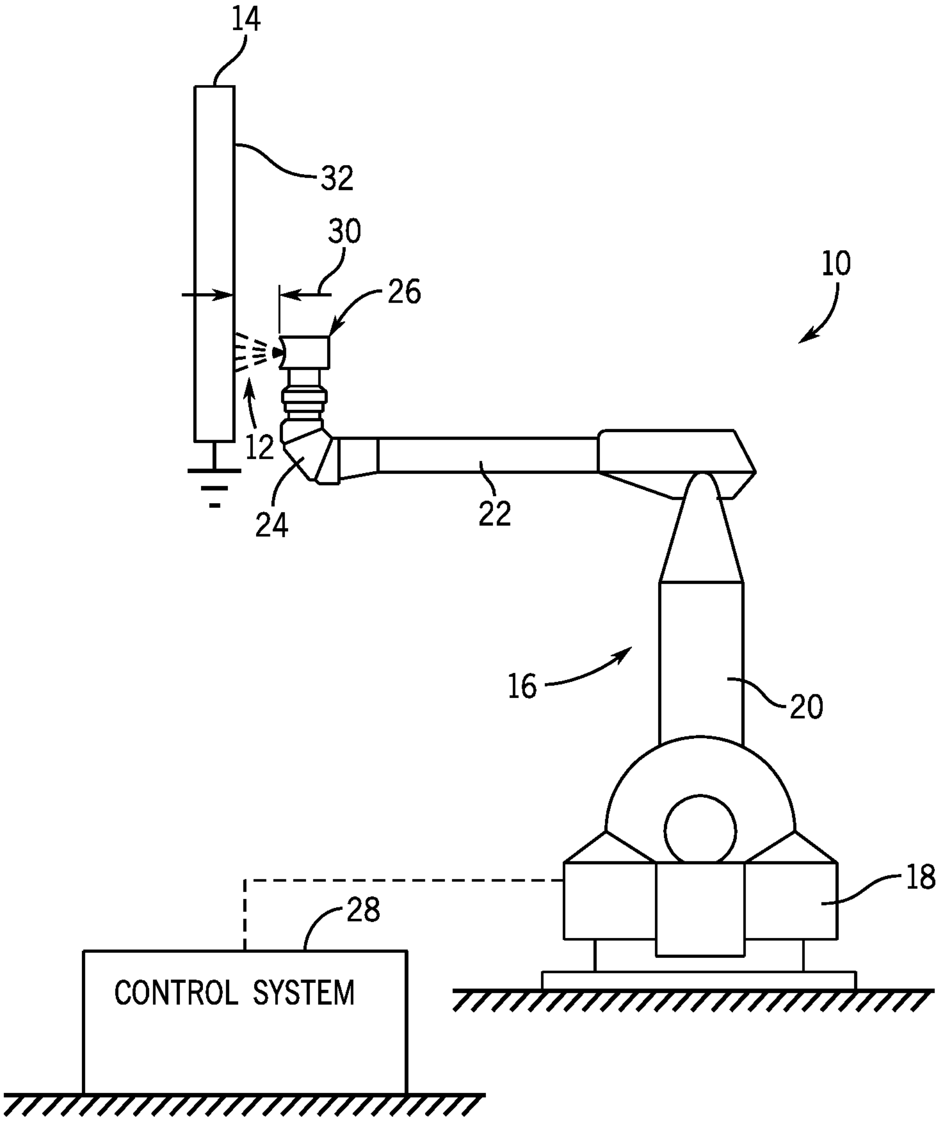

(51) Int. Cl.

| | |
|---|---|
| ***B05B 13/04*** | (2006.01) |
| ***B05B 15/68*** | (2018.01) |

ELECTROSTATIC COATING SYSTEM AND METHOD

CROSS REFERENCE TO RELATED APPLICATIONS

This application claims priority from PCT/US2020/024653, filed 25 Mar. 2020, which claims priority to and the benefit of Japanese Patent Application No. JP2019-057371, filed Mar. 25, 2019, entitled "Metallic Coating Method Using Bell Type Electrostatic Coater," and U.S. Provisional Application Ser. No. 62/824,151, filed Mar. 26, 2019, entitled "Electrostatic Coating System and Method," each of which is herein incorporated by reference in its entirety for all purposes.

BACKGROUND

The present disclosure relates generally to an electrostatic coating system and method.

During the manufacture of commercial goods, workpieces may be constructed and subsequently coated in a material (e.g., paint, protective film, polyurethane, powder, etc.). For example, a workpiece to which a coating material may be applied may include a panel of an automobile, a bicycle frame, a toy, a tool, or other article of manufacture. The application of a uniform layer of material to the workpiece is desired to increase the durability and aesthetics of the coating and of the workpiece, as well as to mitigate waste of coating material. To this end, electrostatic coating systems may be used. Electrostatic coating systems apply an electric charge to particles of the coating material to improve adherence of the coating material to a surface of the workpiece. Electrostatic coating systems may be used with liquid coating materials, as well as powder coating materials. For liquid coating materials, the electrostatic coating systems may include spray gun-type coating devices or rotary atomization-type coating devices. Unfortunately, the transfer efficiency (e.g., amount of coating material adhered to a workpiece compared to total amount of coating material utilized in a coating process) of existing electrostatic coating systems and methods may be limited.

BRIEF DESCRIPTION

Certain embodiments commensurate in scope with the original claims are summarized below. These embodiments are not intended to limit the scope of the claims, but rather these embodiments are intended only to provide a brief summary of possible forms of the systems and techniques described herein. Indeed, the presently disclosed embodiments may encompass a variety of forms that may be similar to or different from the embodiments set forth below.

In one embodiment, a coating apparatus includes a spray applicator configured to discharge a coating material toward a surface of a workpiece, wherein the spray applicator includes an air shaping orifice, and wherein the spray applicator is configured to generate an electric field between the spray applicator and the workpiece and a positioning system configured to adjust a position of the spray applicator relative to the surface of the workpiece. The coating apparatus further includes a control system configured to regulate operation of the spray applicator and/or the positioning system to: maintain the spray applicator within a coating distance between 20 millimeters (mm) and 100 mm from the surface of the workpiece during spray operations of the spray applicator, maintain a flow rate of shaping air through the air shaping orifice between 150 normal liters per minute (Nl/min) and 300 Nl/min during spray operations of the spray applicator, and maintain an electrical potential of the electric field between 30 kilovolts (kV) and 40 kV during spray operations of the spray applicator.

In another embodiment, a method for applying a coating material to a workpiece includes positioning a spray applicator adjacent to the workpiece, such that a distance from a rotary atomizer of the spray applicator to the workpiece is between 20 millimeters (mm) and 100 mm, generating an electric field between the spray applicator and the workpiece at an electrical potential between 30 kilovolts (kV) and 40 kV, discharging a flow of shaping air via an air shaping orifice of the spray applicator at a flow rate between 150 normal liters per minute (Nl/min) and 300 Nl/min, and discharging the coating material via the rotary atomizer to apply the coating material to the workpiece.

DRAWINGS

Figure 2:
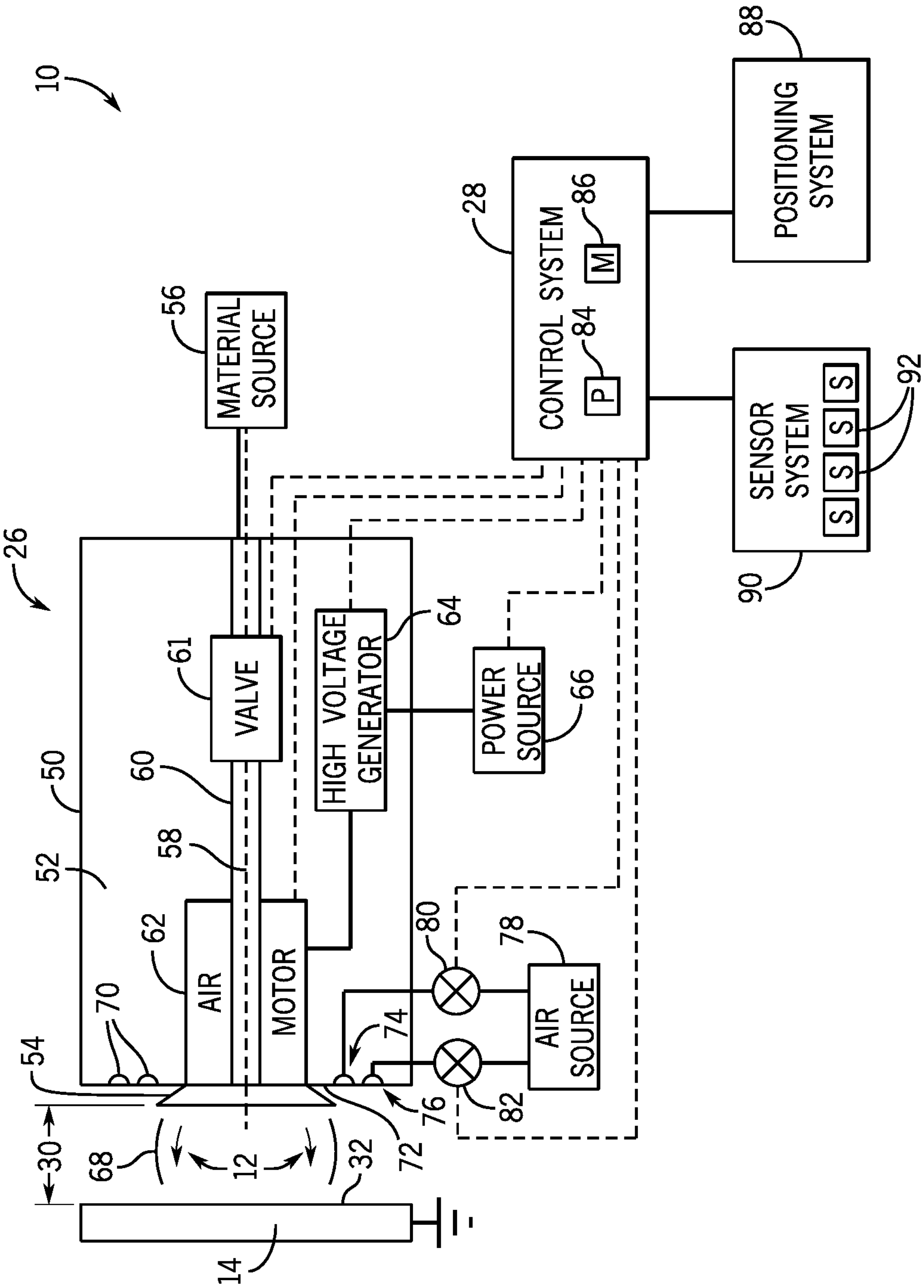

These and other features, aspects, and advantages of the present disclosure will become better understood when the following detailed description is read with reference to the accompanying drawings in which like characters represent like parts throughout the drawings, wherein:

FIG. 1 is a schematic side view of an embodiment of an electrostatic coating system, in accordance with an aspect of the present disclosure; and FIG. 2 is a schematic of an embodiment of an electrostatic coating system, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure generally relate to a system and method for a coating material application. More specifically, present embodiments are directed to an electrostatic coating system and method configured to provide improved transfer efficiency of a coating material used in coating processes. For example, an electrostatic coating system may be configured to monitor and/or control various operational parameters of the system to enable improved adherence of electrostatically-charged coating material particles to a workpiece. That is, an electrostatic coating system, in accordance with present techniques, is configured to enable the adherence of a greater percentage of coating material utilized in a coating process to a workpiece coated with the coating material by the electrostatic coating system. Additionally, certain embodiments include an electrostatic coating system having elements or components of a particular configuration and/or composition to enable improved transfer efficiency of coating material to a workpiece. In this manner, the disclosed embodiments enable a reduction in waste of coating material utilized in coating processes and thereby reduce costs and/or maintenance associated with operation of electrostatic coating systems. The disclosed embodiments also enable improved adherence of the coating material to the workpiece, which improves the quality of the coating and the aesthetics of the coating applied to the workpiece.

With the foregoing in mind, FIG. 1 is a schematic of an embodiment of a coating apparatus 10 configured to apply a coating material 12 to a workpiece 14. For example, the workpiece 14 may be an article of manufacture, such as an automobile panel, a bicycle, a vehicle component, a consumer toy, a tool, or any other suitable item. The coating material 12 may be any suitable material, such as paint (e.g., metallic paint), protective film, polyurethane, powder, and so forth. In the present embodiment, the coating apparatus 10 includes a robotic system 16 having a base 18 and a vertical arm 20 extending from the base 18. The robotic system 16 further includes a horizontal arm 22 extending from a distal or free end of the vertical arm 20. As will be appreciated, the horizontal arm 22 may be configured to rotate, pivot, or otherwise actuate relative to the vertical arm 20. At a distal end of the horizontal arm 22, an articulating joint 24 extends towards the workpiece 14 and includes an electrostatic coating system 26 (e.g., electrostatic coating unit, spray system, spray head, rotary atomizer, etc.) disposed thereon. In some embodiments, one electrostatic coating system 26 may be positioned on the articulating joint 24, and, in other embodiments, multiple electrostatic coating systems 26 may be positioned on the articulating joint 24. As discussed in further detail below, operation of the coating apparatus 10, including the robotic system 16 and/or the electrostatic coating system 26, may be regulated by a control system 28.

As shown in FIG. 1, the electrostatic coating system 26 is positioned at a coating distance 30 from the workpiece 14. More specifically, the electrostatic coating system 26 (e.g., a spray outlet of the electrostatic coating system 26, a rotary bell or atomizer of the electrostatic coating system 26, etc.) is positioned by the robotic system 16 to be spaced by the coating distance 30 from a surface 32 of the workpiece 14 to be coated with the coating material 12. In accordance with present techniques, the coating distance 30 is selected to enable improved transfer efficiency of the coating material 12 to the surface 32 of the workpiece 14. In certain embodiments, the control system 28 may regulate operation of the robotic system 16 to adjust and/or maintain a position of the electrostatic coating system 26 relative to the surface 32 of the workpiece 14, such that the coating distance 30 remains within a target range of values and/or within a threshold amount of a target value. For example, the coating distance 30 may be between approximately 5 millimeters (mm) and 200 mm, between approximately 10 mm and 150 mm, between approximately 20 mm and 100 mm, or between approximately 25 mm and 50 mm. In some embodiments, the target coating distance 30 may be approximately 50 mm. As will be appreciated, the values of the coating distance 30 disclosed herein may be considered "super proximity" coating distances or distances that are smaller as compared to conventional coating distances. As discussed below, in some embodiments, the control system 28 may adjust a position of the electrostatic coating system 26 via actuation of the robotic system 16 based on sensor feedback in order to achieve the coating distance 30 of a desired value.

FIG. 2 is a schematic diagram of an embodiment of the coating apparatus 10, illustrating various components of the coating apparatus 10 and, in particular, the electrostatic coating system 26. The electrostatic coating system 26 includes a spray applicator 50 configured to output the coating material 12 onto the surface 32 of the workpiece 14. The spray applicator 50 has a main body 52 and a rotary atomizer 54 (e.g., bell cup, rotary atomizing head, etc.) disposed at an end of the main body 52. In accordance with present techniques, the rotary atomizer 54 may be formed from a semi-conductive resin. The semi-conductive resin may enable generation of an electric field of a desired magnitude (e.g., voltage potential) between the rotary atomizer 54 and the workpiece 14 during operation of the coating apparatus 10.

The spray applicator 50 (e.g., the main body 52) is configured to receive a flow of coating material 12 from a material source 56 and emit the coating material 12 toward the surface 32 of the workpiece 14. In the illustrated embodiment, the coating material 12 flows through the main body 52 along and/or substantially parallel to a lengthwise axis 58 that extends along or through a center of the main body 52 and the rotary atomizer 54. More specifically, a coating material conduit 60 extends through the main body 52 to route the coating material 12 from the material source 56 to the rotary atomizer 54. However, in other embodiments, a flow path of the coating material 12 through the main body 52 may extend along other axes or conduits. For example, the main body 52 may include other internal structures or components (e.g., tubes, pipes, conduits, reservoirs, or other structure to convey a fluid) that guide the flow of coating material 12 through the main body 52 (e.g., along the lengthwise axis 58). As shown, the spray applicator 50 also includes a valve 61 (e.g., a flow control valve and/or an on-off valve) disposed along the coating material conduit 60, which is configured to regulate a flow of the coating material 12 (e.g., a flow rate, a pressure, etc.) through the coating material conduit 60 to the rotary atomizer 54. The valve 61 may be controlled by the control system 28, in some embodiments. Furthermore, in the illustrated embodiment, the main body 52 has a substantially straight or linear configuration, but, in other embodiments, the main body 52 may include bends, angles, or other suitable configurations.

The flow of coating material 12 may exit the main body 52 through coating material outlets of the rotary atomizer 54. The pressure of the flow of coating material 12 (e.g., within the coating material conduit 60 transmitting the coating material 12 through the main body 52) causes the coating material 12 to exit the coating material outlets and travel along the rotary atomizer 54 (e.g., bell cup, rotary atomizing head, etc.), which is rotatably coupled to the main body 52 and rotates about the lengthwise axis 58. More specifically, the spray applicator 50 includes an air motor 62 (e.g., disposed within the main body 52) that is configured to rotate the rotary atomizer 54.

As the flow of coating material 12 contacts and is discharged from the rotating atomizer 54, the flow of coating material 12 is broken up into smaller particles. That is, the coating material 12 may exit the coating material outlets at an elevated speed (e.g., due to the pressure within the coating material conduit 60 transmitting the coating material 12), the coating material 12 may travel along a forward surface (e.g., a curved surface facing the workpiece 14 in an operational configuration or position) of the rotary atomizer 54, and the coating material 12 may become atomized within an exit region of the spray applicator 50. As will be appreciated, atomization of the coating material 12 may improve the adherence properties of the coating material 12 as the coating material 12 is directed toward the surface 32 of the workpiece 14 to be coated.

The spray applicator 50 also includes a high voltage generator 64 (e.g., a cascade voltage multiplier, a high voltage controller, electrical component, etc.), which may be disposed within the main body 52. The high voltage generator 64 is configured to receive a voltage (e.g., AC electrical power) from a power source 66 and to convert the voltage into a higher voltage (e.g., DC electrical power). The higher voltage may be transmitted by the high voltage generator 64 to the air motor 62 (e.g., to drive rotation of the air motor 62) and to the rotary atomizer 54. In some embodiments, the higher voltage is transmitted to the rotary atomizer 54 via a case or housing of the air motor 62 coupled to the rotary atomizer 54. In some embodiments, a resistor (e.g., a high value resistor) may be positioned between the air motor 62 and the rotary atomizer 54. During operation, when the higher voltage is applied to the rotary atomizer 54, an electric field 68 may be generated between the rotary atomizer 54 and the workpiece 14. As will be appreciated, the atomized coating material 12 exiting the rotary atomizer 54 may be electrostatically-charged via the electric field 68, which may promote adherence of the coating material 12 to the surface 32 of the workpiece 14.

Operation of the high voltage generator 64, the power source 66, and/or the air motor 62 may be regulated via the control system 28 to improve operation of the coating apparatus 10 (e.g., to improve transfer efficiency of the coating material 12 from the spray applicator 50 to the workpiece 14). For example, in accordance with present techniques, the control system 28 may be configured to regulate operation of the high voltage generator 64, the power source 66, or other component (e.g., the robotic system 16), such that the electric field 68 generated between the rotary atomizer 54 and the workpiece 14 has an electric potential difference of between approximately 10 kilovolts (kV) and 60 kV, between approximately 20 kV and 50 kV, between approximately 30 kV and 40 kV, or approximately 35 kV. In some embodiments, the control system 28 may adjust other operating parameters of the electrostatic coating system 26 (e.g., based on sensor feedback) to achieve the electric field 68 within a target electrical potential range or within a threshold value of a target electric potential value. As should be appreciated, operation of the coating apparatus 10 to generate the electric field 68 at and/or within the disclosed electrical potential values and in a position at and/or within the disclosed coating distance 30 values relative to the workpiece 14 may improve transfer efficiency of the coating material 12 from the spray applicator 50 to the workpiece 14.

The coating apparatus 10 includes additional features to improve adherence of the coating material 12 discharged by the spray applicator 50 to the workpiece 14. Specifically, the spray applicator 50 includes air shaping features configured to promote a desired spray pattern of the coating material 12 discharged by the rotary atomizer 54 toward the workpiece 14. In the illustrated embodiment, the spray applicator 50 includes air shaping orifices 70 (e.g., holes, nozzles, etc.) formed on a front end surface 72 of the main body 52. The air shaping orifices 70 may be arranged on the front end surface 72 in any suitable pattern or configuration. For example, in the illustrated embodiment, the main body 52 includes a first arrangement 74 (e.g., annular arrangement) of air shaping orifices 70 (e.g., inner air shaping orifices) and a second arrangement 76 (e.g., annular arrangement) of air shaping orifices 70 (e.g., outer air shaping orifices) disposed radially outward from the first arrangement 74 of air shaping orifices 70 relative to the longitudinal axis 58 of the main body 52.

As will be appreciated, shaping air may be discharged from the air shaping orifices 70 during operation of the spray applicator 50 in order to guide the discharged coating material 12 toward the workpiece 14 in a desired manner. For example, the shaping air may be discharged in order to generate a desired spray pattern of the coating material 12. The shaping air may be supplied to the air shaping orifices 70 from an air source 78. For example, air from the air source 78 may be supplied to a first cavity within the main body 52 that is associated with (e.g., fluidly coupled to) the first arrangement 74 of air shaping orifices 70 and may be supplied to a second cavity within the main body 52 that is associated with (e.g., fluidly coupled to) the second arrangement 76 of air shaping orifices 70. In the illustrated embodiment, air supplied to the first arrangement 74 of air shaping orifices 70 is regulated by a first flow control valve 80, and air supplied to the second arrangement 76 of air shaping orifices 70 is regulated by a second flow control valve 82. The first and second flow control valves 80 and 82 maybe be components of the spray applicator 50 (e.g., disposed within the spray applicator 50), or the first and second flow control valves 80 and 82 may be separate components disposed external to the spray applicator 50.

Operation of the first and second flow control valves 80 and 82 may be regulated by the control system 28. For example, the control system 28 may adjust the first flow control valve 80 and/or the second flow control valve 82 to enable discharge of shaping air via the first arrangement 74 of air shaping orifices 70 and/or the second arrangement 76 of air shaping orifices 70, respectively, at a rate of between approximately 50 normal liters per minute (Nl/min) and 400 Nl/min, between approximately 100 Nl/min and 350 Nl/min, between approximately 150 Nl/min and 300 Nl/min, between approximately 200 Nl/min and 250 Nl/min, or at approximately 225 Nl/min. As similarly discussed above, operation of the coating apparatus 10 at and/or within the disclosed air shaping discharge flow rates, at and/or within the disclosed electrical potential values, and/or at and/or within the disclosed coating distance 30 values may improve transfer efficiency of the coating material 12 discharged from the spray applicator 50 toward the workpiece 14. For example, the transfer efficiency of the coating material 12 discharged by the spray applicator 50 operating according to the disclosed techniques may be approximately 70 percent, 80 percent, 90 percent, or greater.

As discussed in detail above, various operating parameters and operation of various components may be monitored, regulated, and/or controlled by the control system 28. For example, the valve 61, the high voltage generator 64, the power source 66, the air motor 62, the first and second flow controls valves 80 and 82, the robotic system 16, and/or any other suitable component or parameter of the coating apparatus 10 may be monitored and/or regulated by the control system 28. To this end, the control system 28 may include a distributed control system (DCS) or any computer-based workstation that is fully or partially automated. For example, the control system 28 may include a processor 84 (e.g., one or more microprocessors) that may execute software programs to perform the disclosed techniques. The processor 84 may include multiple microprocessors, one or more "general-purpose" microprocessors, one or more special-purpose microprocessors, and/or one or more application specific integrated circuits (ASICS), or some combination thereof. For example, the processor 84 may include one or more reduced instruction set (RISC) processors.

The control system 28 may also include a memory 86 for storing instructions executable by the processor 84. Data stored on the memory 86 may include, but is not limited to, movement algorithms of the robotic system 16, target values or ranges of the electric field 68 potential difference, target values or ranges of the coating distance 30, target values or ranges of shaping air flow rates, high voltage generator 64 operating parameters, air motor 62 operating parameters, coating material 12 flow rates and/or pressures, valve 61 positions (e.g., corresponding to coating material 12 flow rates and/or pressures), and so forth. The memory 86 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). Further, the control system 28 may include multiple controllers or control systems distributed across the coating apparatus 10 (e.g., each of the robotic system 16, the high voltage generator 64, the first and second flow control valves 80 and 82, and so forth, may include one or more controllers or control systems configured to regulate operation of its respective system and/or to communicate with a common or master controller or control system).

As mentioned above, the control system 28 may also be configured to regulate operation of one or more of the components discussed herein based on feedback. For example, the coating apparatus 10 may include a positioning system 88 (e.g., the robotic system 16, a conveyor system configured to move the workpiece 14, etc.) that may adjust the position of one or more components of the coating apparatus 10 based on feedback provided by a sensor system 90. The sensor system 90 may include sensors 92 configured to measure, detect, or otherwise determine an operating parameter of the coating apparatus 10 (e.g., the coating distance 30, the voltage potential of the electric field 68, coating material 12 flow rate and/or pressure, etc.), and the control system 28 may be configured to adjust operation of the coating apparatus 10 based on the operating parameter(s) detected by the sensor 92. The sensors 92 may include optical sensors, pressure sensors, light sensors, vibration sensors, flow rate sensors, temperature sensors, voltage sensors, or any other suitable type of sensors. For example, based on a detected value of the coating distance 30 (e.g., detected by one of the sensors 92) that is outside a target range or that exceeds a target value by a threshold amount, the control system 28 may adjust the position of the spray applicator 50 relative to the workpiece 14 (e.g., via actuation and/or manipulation of the positioning system 88 and/or via actuation and/or manipulation of the robotic system 16), such that the detected coating distance 30 approaches the target value or range. The control system 28 may similarly adjust operation of one or more components (e.g., the valve 61, the air motor 62, the high voltage generator 64, etc.) described herein based on feedback from the sensors 92 indicative of other operating parameter values of the coating apparatus 10. Indeed, the control system 28 may adjust operation of any suitable component of the coating apparatus 10 to achieve values of operating parameters (e.g., coating distance 30, voltage potential of electric field 68, flow rate of shaping air, etc.) within the desired ranges described herein. In this manner, operation of the coating apparatus 10 is improved by enabling greater transfer efficiency of the coating material 12 applied to the workpiece 14 via the spray applicator 50.

As discussed in detail above, embodiments of the present disclosure are directed to an electrostatic coating system and method configured to enable improved transfer efficiency in coating processes. For example, an electrostatic coating system may be configured to monitor and/or control various operational parameters to enable improved adherence of electrostatically-charged coating material particles to a workpiece. That is, an electrostatic coating system, in accordance with present techniques, is configured to enable the adherence of a greater percentage of coating material utilized in a coating process to a workpiece coated with the coating material by the electrostatic coating system. As discussed in detail above, an electrostatic coating system and/or apparatus may be controlled to be positioned at a target distance or within a target range of distance from a workpiece to improve transfer efficiency of the coating process. For example, the electrostatic coating system may be controlled such that a distance from a rotary atomizer of the electrostatic coating system to the workpiece is between 20 millimeters (mm) and 100 mm. That is, the electrostatic coating system and/or apparatus may be controlled such that the distance from the rotary atomizer to the workpiece is 20 mm or greater and 100 mm or less.

Similarly, the electrostatic coating system may be controlled to generate an electric field between a spray applicator of the electrostatic coating system and the workpiece having an electrical (e.g., voltage) potential within a target range of values. For example, the electrostatic coating system may be controlled such that the potential of the electric field is 30 kilovolts (kV) or more and 40 kV or less. The electrostatic coating system may also be controlled to output air shaping flows at a target flow rate or within a target range of flow rates. For example, the target range of flow rates may be between 150 normal liters per minute (Nl/min) and 300 Nl/min. In this manner, the disclosed embodiments enable a reduction in waste of coating material utilized in coating processes and thereby reduce costs and/or maintenance associated with operation of electrostatic coating systems. Additionally, the improved adherence of coating material to a workpiece enabled by the disclosed techniques further enables improved quality of coatings applied to workpieces and improved aesthetics of coating materials applied to workpieces.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be noted that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method for applying a coating material to a workpiece, comprising:

positioning a spray applicator adjacent to the workpiece, such that a distance from a rotary atomizer of the spray applicator to the workpiece is between 20 millimeters (mm) and 100 mm;

generating an electric field between the spray applicator and the workpiece at an electrical potential between 30 kilovolts (kV) and 40 kV;

discharging a flow of shaping air via an air shaping orifice of the spray applicator at a flow rate between 150 normal liters per minute (Nl/min) and 300 Nl/min; and discharging the coating material via the rotary atomizer to apply the coating material to the workpiece; and maintaining the distance from the rotary atomizer to the workpiece between 20 mm and 100 mm while discharging the coating material, wherein maintaining the distance from the rotary atomizer to the workpiece between 20 mm and 100 mm while discharging the coating material comprises adjusting operation of a positioning system coupled to the spray applicator based on feedback from a first sensor indicative of a value of the distance.

2. The method of claim 1, wherein positioning the spray applicator adjacent to the workpiece comprises controlling operation of a robotic arm, wherein the spray applicator is coupled to a distal end of the robotic arm.

3. The method of claim 1, wherein generating the electric field between the spray applicator and the workpiece comprises:

generating the electric field between the rotary atomizer and the workpiece;

directing power from a power source to a high voltage generator of the spray applicator;

directing a voltage from the high voltage generator to an air motor of the spray applicator; and directing the voltage from the air motor to the rotary atomizer.

4. The method of claim 1, comprising:

maintaining the electrical potential between 30 kV and 40 kV while discharging the coating material; and maintaining the flow rate between 150 Nl/min and 300 Nl/min while discharging the coating material.

5. The method of claim 4, wherein:

maintaining the electrical potential between 30 kV and 40 kV while discharging the coating material comprises adjusting operation of an electrical component of the spray applicator based on feedback from a second sensor indicative of a value of the electrical potential;

maintaining the flow rate between 150 Nl/min and 300 Nl/min while discharging the coating material comprises adjusting operation of a shaping air flow control valve based on feedback from a third sensor indicative of a value of the flow rate; or any combination thereof.

* * * * *